(12) United States Patent
Furusawa

(10) Patent No.: US 7,579,075 B2
(45) Date of Patent: Aug. 25, 2009

(54) PHENOLIC NOVOLAK RESIN FOR SHELL MOLD, PROCESS FOR PRODUCING THE SAME, AND RESIN COATED SAND

(75) Inventor: Hiroshi Furusawa, Niwa-Gun (JP)

(73) Assignee: Asahi Organic Chemicals Industry Co., Ltd., Nobeoka-Shi (JP)

( * ) Notice: Subject to any disclaimer, the term of this patent is extended or adjusted under 35 U.S.C. 154(b) by 0 days.

(21) Appl. No.: 12/039,812

(22) Filed: Feb. 29, 2008

(65) Prior Publication Data

US 2008/0171205 A1    Jul. 17, 2008

Related U.S. Application Data

(63) Continuation of application No. PCT/JP2006/321274, filed on Oct. 25, 2006.

(30) Foreign Application Priority Data

Oct. 27, 2005    (JP)    ............................ 2005-312395

(51) Int. Cl.
    *B32B 29/00* (2006.01)
(52) U.S. Cl. ........................ 428/323; 428/331; 428/403; 428/404; 428/406; 428/407; 523/139; 523/145; 523/201
(58) Field of Classification Search ................. 428/323, 428/331, 403, 404, 406, 407; 523/139, 145; 523/201
See application file for complete search history.

(56) References Cited

U.S. PATENT DOCUMENTS 4,876,324 A * 10/1989 Nakano et al. .............. 528/142

FOREIGN PATENT DOCUMENTS

| JP | 57-068240 | A1 |   | 4/1982 |
| JP | 59-127947 |    | * | 7/1984 |
| JP | 59-127947 | A1 |   | 7/1984 |
| JP | 04-202312 | A1 |   | 7/1992 |
| JP | 2001-321883 | A1 | | 11/2001 |
| JP | 2002-102999 |    | * | 4/2002 |
| JP | 2002-102999 | A1 | | 4/2002 |

* cited by examiner

*Primary Examiner*—Leszek Kiliman
(74) *Attorney, Agent, or Firm*—Burr & Brown

(57) ABSTRACT

It is an object of the present invention to provide a phenolic novolak resin for a shell mold which is capable of simultaneously solving a problem of gas defect caused by a tar generated at the time of casting and a problem of a casting defect represented by veining. As the phenolic novolak resin in RCS for the shell mold, there is used a copolycondensation resin-type phenolic novolak resin obtained by reacting a phenol and an alkylphenol, with at least one of aldehydes, wherein a ratio of an ortho-bond to a para-bond of a methylene group in the phenolic novolak resin is not less than 1.5, and a fire-resisitant particle is coated with this resin.

10 Claims, 1 Drawing Sheet

PHENOLIC NOVOLAK RESIN FOR SHELL MOLD, PROCESS FOR PRODUCING THE SAME, AND RESIN COATED SAND

This application is a continuation of the International Application No. PCT/JP2006/321274, filed Oct. 25, 2006, which claims the benefit under 35 U.S.C. §119(a)-(d) of Japanese Application 2005-312395, filed Oct. 27, 2005, the entireties of which are incorporated herein by reference.

TECHNICAL FIELD

The present invention relates to a phenolic novolak resin for a shell mold, a process for producing the same, and a resin coated sand. In particular, the present invention relates to a resin coated sand for a shell mold, which restricts a generation of a pyrolysis product (hereinafter simply referred to as "tar") generated at a time of casting (molding) and which is useful to simultaneously solve a problem of a occurrence of a casting burr (also called as veining and hereinafter simply referred to as "veining") on a surface of a casted (molded) product at a time of casting and a problem of a gas defect. The present invention also relates to a phenolic novolak resin which can advantageously provide the resin coated sand for a shell mold.

BACKGROUND ART

Conventionally, in casting by using a shell mold, there is generally used a shell casting mold, which is formed by using a resin coated sand obtained by kneading a fire-resistant particle, a phenolic novolak resin (binder), and hexamethylenetetramine (hardener), and by hot-forming the resin coated sand into a desired shape.

However, in a casting process by using this kind of casting molds, especially by using a casting mold which has a complex configuration, e.g., a casting mold for casting a molded product such as a cylinder head of an internal combustion system, there is a problem of easily causing a fracture or a crack (hereinafter referred to as "crack" of the casting mold) on the molded product, during the casting process using the casting mold, which leads to an occurrence of the veining on the surface on the casting mold. In addition, there is a recent trend that the configuration of the casting mold is increasingly complex, while a number of vents for gas purging is decreased, so that an occurrence of the gas defect within the casting mold at the time of casting due to the tar originated from a bond has also been a serious problem.

In order to solve the above-described problems, there are proposed methods to use bisphenol A, a residue from a production of bisphenol A, and/or a separated compound or a derivative thereof in the residue, as a raw material of the phenolic novolak resin (see Patent Documents 1 and 2). These methods have sufficiently solved the problem of the veining caused on the surface of the molded product. However, there is newly caused a problem of a gas defect, caused by a large amount of the tar generated at the time of casting.

Meanwhile, automobile makers attempt to take measures, such as providing a casting die with vents, so as to reduce the gas defect. However, if a large amount of the tar is produced, the vents are easily blocked, so that a number of times of maintenances of the vents is increased, which leads to lower the productivity, and aggravate the problem. Therefore, there is highly desired to simultaneously solve these problems.

Patent document 1: JP-A-57-68240

Patent document 2: JP-A-2001-321883

DISCLOSURE OF THE INVENTION

Problem to be Solved by the Invention

The present invention has been made in the light of the situations discussed above. It is therefore an object of the present invention to provide: a phenolic novolak resin for a shell mold, which is capable of simultaneously solving a problem of a gas defect caused by a tar generated at a time of casting and a problem of a casting defect represented by veining; a process for producing the phenolic novolak resin for a shell mold; a resin coated sand (hereinafter abbreviated as "RCS") for a shell mold, which is a fire-resistant particle coated with the phenolic novolak resin; and a casting mold obtained by using such RCS.

Means for Solving the Invention

The present inventors have conducted intensive study and research in an effort to solve the above-mentioned problems with respect to RCS for the shell mold. The present inventors have found that the problems of the gas defect and the veining defect caused by the tar generated at the time of casting RCS for the shell mold can be simultaneously solved by using a copolycondensation resin-type phenolic novolak resin obtained by reacting phenolic compounds, which include a phenol and an alkylphenol, with at least one of aldehydes, wherein a ratio of an ortho-bond to a para-bond, or an ortho/para bond ratio of a methylene group in the phenolic novolak resin is not less than 1.5 as the phenolic novolak resin in RCS for the shell mold. In this way, the present invention has been completed.

The above-indicated object may be achieved according to a principle of the invention, which provides a phenolic novolak resin for a shell mold, characterized in that: the phenolic novolak resin is obtained by reacting phenolic compounds, which include a phenol and an alkylphenol, with at least one of aldehydes; and a ratio of an ortho-bond to a para-bond of a methylene group in the phenolic novolak resin is not less than 1.5.

In one preferred form of a phenolic novolak resin for the shell mold according to the present invention, the alkylphenol is orthocresol, and in another preferred form of the present invention, amounts of the phenol and the alkylphenol are 90~30 percents by mass and 10~70 percents by mass, respectively, based on a total amount of the phenol and the alkylphenol.

In addition, in the phenolic novolak resin for the shell mold according to the present invention, the phenolic compounds further include at least one of third components selected from the group consisting of bisphenol A, a residue from a production of bisphenol A, a separated compound in the residue, and a derivative of the separated compound. The at least one of third components included in the phenolic compound is advantageously not more than 100 parts by mass per 100 parts by mass of the alkylphenol.

In the present invention, in producing the phenolic novolak resin for a shell mold, the phenolic compounds and the at least one of aldehydes are advantageously reacted in the presence of a divalent metal salt. Accordingly, the intended phenolic novolak resin can be efficiently obtained.

Moreover, it is also a principle of the present invention to provide a resin coated sand for the shell mold formed by coating a fire-resistant particle with the phenolic novolak resin for the shell mold as described above.

In one preferred form of the resin coated sand for the shell mold according to the present invention, a test piece of the resin coated sand made in accordance with provisions of JIS K 6910 generates a tar of not more than 10 mg, when the test piece is heated in a tubular furnace at 600° C. for six minutes, and a flexibility of a casting mold formed of the resin coated sand is not less than 2 mm.

In another preferred form of the resin coated sand for the shell mold according to the present invention, the resin coated sand further includes an alkali metal salt of an oxygen acid. In addition to, or instead of the alkali metal salt of the oxygen acid, the resin coated sand includes at least one of metal oxides selected from the group consisting of iron, copper, nickel, cobalt, and zinc.

In addition, it is also an object of the invention to provide a casting mold obtained by forming and heat-curing the resin coated sand for a shell mold as described above.

ADVANTAGEOUS EFFECT OF THE INVENTION

In RCS for the shell mold which is formed of the predetermined fire-resistant particle coated with an alkylphenol-modified phenolic resin which is the phenolic novolak resin obtained by reacting the phenolic compounds, which include the phenol and the alkylphenol, with the at least one of aldehydes, wherein the ortho/para bond ratio of the methylene group in the phenolic novolak resin is not less than 1.5, there is effectively reduced the amount of the tar generated from the casting mold when a desired casting mold is formed from by RCS. In addition, there can be sufficiently assured a "flexibility" of the casting mold. Accordingly, there can be simultaneously solved the problem of the gas defect caused by the tar at the time of casting and the problem of the casting defect such as veining.

The characteristic effect of the present invention can be more advantageously exhibited by using RCS, of which the amount of generation of the tar as described above is not more than 10 mg, and the flexibility of the casting mold formed of RCS is not less than 2 mm.

In the present invention, in addition to the phenolic novolak resin for the shell mold according to the present invention, there is also used the alkali metal salt of the oxygen acid, and/or at least one of metal oxides selected from the group consisting of copper, zinc, nickel, iron, manganese, and cobalt. Accordingly, the salt and/or the oxides are included and are existing in thus formed RCS, so that there can be more advantageously enjoyed the above-described excellent effects.

BEST MODE FOR CARRYING OUT THE INVENTION

Figure 1:
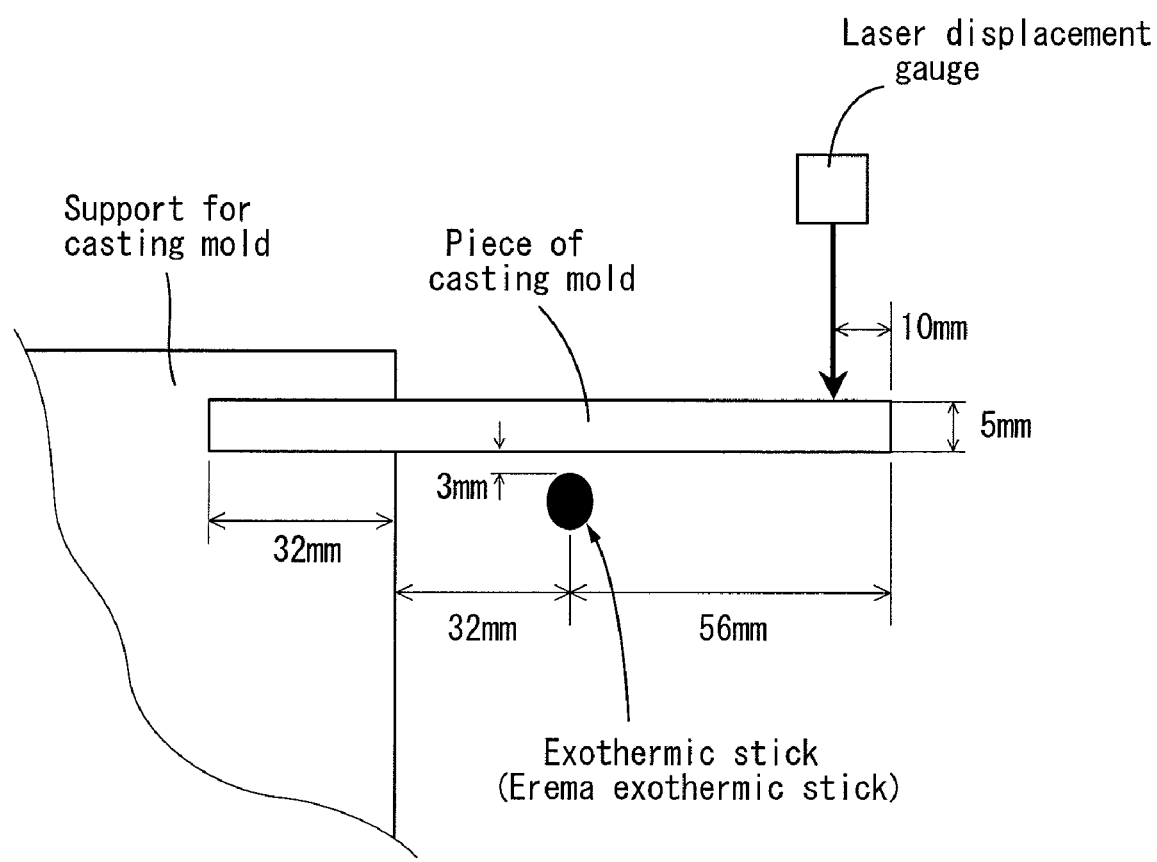
FIG. 1 is a view for explaining a form of measuring the "flexibility" of the casting mold which is measured in EXAMPLES.

As described above, the phenolic novolak resin for the shell mold according to the present invention is obtained by reacting the phenolic compound including the phenol and the alkylphenol, with the at least one of aldehydes, in the presence of a catalyst for the reaction such as the metal salt. In other words, the phenolic novolak resin for the shell mold is a copolycondensed resin (copolycondensed alkylphenol-modified phenolic resin) obtained by reacting the phenolic compounds such as the above-mentioned phenol and alkylphenol, simultaneously or gradually, with the at least one of aldehydes, and the ortho/para bond ratio which regulates a structure of the methylene group in the phenolic resin thus obtained is not less than 1.5.

The phenolic novolak resin for the shell mold displays a characteristic of heat-curing, by heated, advantageously under a presence of a hardener, or under an absence of the hardener. Accordingly, the fire-resistant particles are hardened and adhered to one another, so that thus obtained casting mold has an effective strength. In the present invention, there is especially used, among the phenolic novolak resins for the shell mold as described above, the phenolic novolak resin of which the ortho/para bond ratio of the methylene group is not less than 1.5, preferably the phenolic novolak resin of which the ortho/para bond ratio of the methylene group is not less than 1.8. If the ortho/para bond ratio is less than 1.5, there is an anxiety that the hardness of an internal part of thus obtained casting mold is not sufficiently improved. As a result, at a time of casting by using thus obtained casting mold, there is an anxiety of increasing the amount of generation of the tar due to a hardening of unhardened part of the casting mold. An upper limit of the ortho/para bond ratio is suitably determined based on physical characteristics etc. of the intended casting mold, and the upper limit is generally not more than 2.8, and preferably not more than 2.6. If the ortho/para bond ratio is excessively large, a strength of the casting mold is deteriorated.

The ortho/para bond ratio of the methylene group in the phenolic novolak resin herein is a ratio of a number of methylene groups, of which bonding positions are ortho positions, to a number of methylene groups, of which bonding positions are para positions, i.e., a ratio of a number of the methylene groups in the resin which are bonded at ortho positions to phenolic hydroxyl groups to a number of the methylene groups which are bonded at para positions to the phenolic hydroxyl groups in the resin. The ortho/para bond ratio in this specification and the claims are values obtained by measuring (calculating) by using $^{13}$C-NMR spectroscopy.

Described in detail, when an integration value of each of a methylene absorption band of each of an ortho-ortho bond, an ortho-para bond, and a para-para bond in the phenolic novolak resin measured by using the $^{13}$C-NMR spectroscopy is determined as a, b, and c, respectively, a value obtained by the following Formula (I) represents the ortho/para bond ratio:

$$[\text{ortho/para bond ratio}]=(a+b/2)/(c+b/2) \qquad \text{Formula (I)}$$

Thus obtained value is shifted according to a substituent, but generally the values of a, b, and c are in ascending order.

The phenolic novolak resin used in the present invention is the alkylphenol-modified phenolic novolak resin, of which the ortho/para bond ratio is not less than 1.5. Any phenolic resin may be used, as long as the above conditions are fulfilled.

In producing the phenolic novolak resin, alkylphenols are used, together with the phenol, as one of essential raw materials for the phenolic compound. Examples of the alkylphenols include alkylphenols represented by o-cresol, m-cresol, p-cresol, o-ethylphenol, m-ethylphenol, p-ethylphenol, 2,3-xylenol, 3,5-xylenol, 2,5-xylenol, 3,4-xylenol, 2-propylphenol, 2-isopropylphenol, 3-propylphenol, 3-isopropylphenol, 4-isopropylphenol, 4-propylphenol, 2-sec-butylphenol, 2-tert-butylphenol, 3-sec-butylphenol, 3-tert-butylphenol, 4-sec-butylphenol, 4-tert-butylphenol, 2-cyclohexylphenol, 3-cyclohexylphenol, 4-cylcohexylphenol, 2-nonylphenol, 3-nonylphenol, 4-nonylphenol, 2-dodecylphenol, 3-dodecylphenol, 4-dodecylphenol, 2-octadecylphenol, 3-octadecylphenol, 4-octadecylphenol, 2-isopropyl-5-methylphenol, 2-tert-butyl-4-methylphenol, 3-methyl-6-tert-butylphenol, 2,3,5-trimethylphenol, and 2,3,5-triethylphenol. Among these alkylphenols, cresol, ethylphenol, xylenol, propylphenol, and butylphenol are preferably used from the point of view of providing the strength and the flexibility of the casting mold, and cresol is especially preferably used from the point of view of economy.

In the present invention, there is also advantageously used as the above-mentioned phenolic compound, together with the phenol and the alkylphenol, the at least one of third components selected from the group consisting of bisphenol A, the residue from the production of bisphenol A, the separated compound in the residue, and the derivative of the separated compound. In particular, the residue from the production of bisphenol A is suitably used. By this additional use of the third component, there can be effectively improved the flexibility of the casting mold and reduced the amount of generation of the tar.

"Bisphenol A" as one of the above-mentioned third components is a symmetrical divalent phenol, produced by a reaction between one molecule of ketone or aldehyde and two molecules of phenols. There is no problem if a little water is included in bisphenol A. Also, "residue from the production of bisphenol A" is a residue generated at the time of distillation purification of bisphenol A synthesized by a condensation reaction between the phenol and the acetone. The residue includes substances such as bisphenol A, O,O'-bisphenol, O,P'-bisphenol, trisphenol, chromane I, and chromane II. Generally, the residue is suitably selected from among commercially available products.

The "separated compound in the residue" includes, as a main component, a composition represented by the following Compound (I), which is produced by a dimerization reaction of p-isopropenylphenol obtained by a degradation reaction of bisphenol-A, and which includes a little amount of an oligomer of which a degree of polymerization is as low as 3~10:

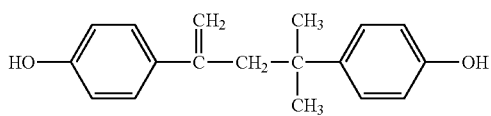

Compound (I)

In addition, "the derivative" is a resin including, as a main component, a composition represented by the following Compound (II), which is obtained by further reacting the above-described composition represented by the above Compound (I) with 2,2,4-trimethyl-4-(hydroxyphenyl)chromane:

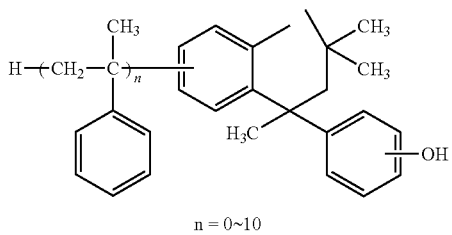

Compound (II)

n = 0~10

Each of the "separated compound in the residue" and "the derivative" is taken out from the residue from the production of bisphenol A or obtained by further reacting the compound taken out from the residue, and has a solid form. The "separated compound in the residue" and "the derivative" may be mixed with and dissolved in a substance such as the phenol, which has an excellent miscibility with the "separated compound in the residue" and "the derivative".

As the at least one of aldehydes which is another raw material which is to be reacted with the phenolic compound to provide the phenolic novolak resin of the present invention, there can be used formaldehyde, formalin, paraformaldehyde, trioxan, acetic aldehyde, paraaldehyde, and propionaldehyde.

Alkylphenols and the at least one of aldehydes to be used in the present invention are not limited to the above-mentioned examples, and any one of or any combination of other alkylphenols and any one of or any combination of aldehydes can certainly be used.

In producing the phenolic novolak resin of the present invention, the amount of use of the alkylphenol is advantageously 10~70 percents by mass (accordingly, the amount of use of the phenol is 90~30 percents by mass), more preferably 15~50 percents by mass, based on a total amount of the phenol and the alkylphenol. If the amount of the alkylphenol is not less than 10 percents by mass, the casting mold formed of RCS for the shell mold made of thus obtained phenolic novolak resin assures a sufficient flexibility. On the other hand, if the amount of the alkylphenol is not more than 70 percents by mass, there can be simultaneously solved the problem of the tar and the veining at the time of the casting.

Amount of the at least one third compounds which is used as one of the above-mentioned phenolic compounds is properly determined according to the intended use. Generally, the third compound is used within a ratio of not more than 100 parts by mass, preferably 5~50 parts by mass, per 100 parts by mass of the alkylphenol which is used as another phenolic compound.

In producing the phenolic novolak resin of the present invention, a blending molar ratio (F/P) of the at least one of aldehydes (F) to the phenolic compound (P) including the phenol and the alkylphenol is preferably determined within a range of 0.60~0.80, more preferably 0.64~0.75. If the blending molar ratio is not less than 0.55, the intended phenolic novolak resin can be produced with a sufficient yield. Meanwhile, if the molar ratio is not more than 0.80, there can be advantageously improved the strength of the casting mold obtained by molding RCS for the shell mold manufactured by using thus obtained phenolic novolak resin.

The methods for producing the phenolic novolak resin of the present invention are not particularly limited, and various known methods for producing the phenolic novolak resin may be adopted. There is advantageously adopted a method for reacting the phenols (phenol and alkylphenol) and the at least one of aldehydes by using a divalent metal salt catalyst as an acid catalyst, because this method can efficiently provide the phenolic novolak resin. As the divalent metal salt catalyst, there are advantageously used zinc chloride, zinc acetate, and zinc borate, because these catalysts can effectively adjust the ortho/para bond ratio of the methylene group in thus obtained phenolic novolak resin to not less than 1.5. However, catalysts other than the above-mentioned ones can also be used. For instance, zinc oxide and magnesium oxide, etc., are also preferably used.

Thus obtained phenolic novolak resin is in a solid or a liquid (e.g., liquid resin, varnish, or emulsion) form, and expresses a heat-curing effect if it is heated in the presence or absence of a hardener or curing catalyst such as hexamethylene tetramine and peroxide. In producing RCS in the present invention, there is preferably used a phenolic novolak resin which has a number average molecular weight within a range of 400~1000, more preferably 500~700. If there is used a phenolic novolak resin which has an number average molecular weight less than 400, there is an anxiety of deteriorating a flowability of RCS. On the other hand, if the number average molecular weight is more than 1000, there is not expected a substantial improvement of the strength of the casting mold.

In the present invention, there can also be used various modified or denatured phenolic novelak resins, which are obtained by mixing or reacting each of the above-mentioned phenolic novolak resin with a desired compound, such as epoxy resin, melamine resin, urea resin, xylene resin, polyvinyl acetate resin, polyamide resin, melamine compound, urea compound, epoxy compound, and cashew nut oil, during or after the process for producing the each of the above-mentioned phenolic novolak resin.

In addition, in producing RCS for the shell mold of the present invention, there can be used any known oxygen acid alkali metal salts and specific oxides, together with the above-mentioned phenolic novolak resin.

Examples of the oxygen acid alkali metal salts include, in particular: alkali metal salts of nitric acid such as sodium nitrate and potassium nitrate; alkali metal salts of permanganic acid such as potassium permanganate; alkali metal salts of molybdic acid such as sodium molybdate; and alkali metal salts of tungstic acid such as sodium tungstate. Among them, there are preferably used alkali metal salts of nitric acid, alkali metal salts of molybdic acid, and alkali metal salts of tungstic acid, which are less likely to lower the strength of the casting mold. There are especially preferably used alkali metal salts of nitric acid, in particular, potassium nitrate, from the point of view of cost. Any one of, or any combination of these oxygen acid alkali metal salts may be used.

The particular metal oxides are oxides, which have one of elements of iron, copper, nickel, manganese, cobalt, and zinc. Preferable examples of the metal oxides include, but are not limited to, iron (I) oxide, iron (II) oxide, ferrosoferric oxide, cobalt (I) oxide, cobalt (II) oxide, nickel (I) oxide, nickel (II) oxide, copper (I) oxide, copper (II) oxide, and zinc oxide, and these metal oxides may be used alone or in combination. Among these metal oxides, there are especially preferably used copper (II) oxide, and a mixture of copper (II) oxide and iron (II) oxide, from the points of view of strength of a core cylinder, a reducing effect of the tar, and a reduction of cost.

A blending amount of the alkali metal salt of the oxygen acid is within a range of 1~50 parts by mass, preferably 3~20 parts by mass per 100 parts by mass of the phenolic novolak resin. If the blending amount is less than 1 part by mass, there are risks of a disintegration of the casting mold and of lowering the effect of reducing the tar. On the other hand, if the blending amount is more than 50 parts by mass, there is a risk that the casting mold is too weak. The alkali metal salt of the oxygen acid may be melt-blended to the phenolic novolak resin before the production of RCS for the shell mold, but it is preferable that the alkali metal salt of the oxygen acid is added to the phenolic novolak resin at the time of producing RCS.

A blending amount of the specific metal oxide of the present invention is within a ratio of 1~50 parts by mass, preferably 3~20 parts by mass per 100 parts by mass of the phenolic novolak resin. If the blending ratio is less than 1 part by mass, there is the risk of lowering the effect of reducing the tar. On the other hand, if the blending amount is more than 50 parts by weight, there is the risk that the strength of the casting mold is too weak. The metal oxide may be melt-blended to the phenolic novolak resin before the production of RCS for the shell mold, but it is preferable that the metal oxide is added to the phenolic novolak resin at the time of producing RCS.

In obtaining RCS for the shell mold according to the present invention, it is desirable to prepare a resin composition as a bond for the purpose of improving physical characteristics of the casting mold, by previously adding a conventionally used silane coupling agent such as γ-aminopropyltriethoxysilane and γ-glycidoxypropyltrimethoxysilane, or a conventionally used lubricant such as ethylenebis(stearylamide) and methylenebis(stearylamide), to the phenolic novolak resin.

RCS for the shell mold according to the present invention is produced by a conventionally known method, preferably by a heating sand mixture method, by coating a surface of a predetermined fire-resistant particle with the resin composition (bond) including the above-mentioned components. Described in detail, in producing RCS in accordance with the heating sand mixture method, a speedmixer is at first charged with a preheated fire-resistant particle, and then the alkylphenol-modified phenolic novolak resin, and the alkali metal salt of the oxygen acid and/or the at least one of oxides of metal(s) selected from the group consisting of copper, zinc, nickel, iron, manganese, and cobalt, as needed. The speedmixer is further charged with other optional additives, and the materials are mixed, and an aqueous solution obtained by dissolving a hardener such as hexamethylenetetramine in a cooling water is added to the mixture, while the mixture is cooled by an air blow. Finally, a lubricant such as calcium stearate is added to the mixture, whereby RCS for the shell mold of the present invention can be obtained.

A blending amount of the phenolic novolak resin in RCS for the shell mold according to the present invention is preferably 0.5~5.0 parts by mass, more preferably 1.0~2.3 parts by mass, per 100 parts by mass of the fire-resistant particle, so as to obtain a practical casting mold strength.

As the fire-resistant particle of the present invention, there may be used a high purity silica sand represented by freemantle silica sand, Unimin sand, Wedron sand, zircon sand, chromite sand, CERABEADS (commercial name, available from ITOCHU CERATECH CORP. (Japan): spheroidal alumina sand), Greenbeads (commercial name, available from KINSEI MATEC CO., LTD. (Japan): spheroidal alumina sand), Sunpearl (commercial name, available from YAMAKAWA SANGYO CO., LTD. (Japan): spheroidal ferronickel slag), ferrochromium spheroidal slag, a recovered or a regenerated product thereof, or a mixture thereof. Any one of, or any combination of them can be used.

While the presently preferred embodiments of the invention have been described in detail, it is to be understood that the present invention is not limited to the details of the illustrated embodiments, but may be otherwise embodied.

In the casting mold obtained by using RCS, which is formed of the fire-resistant particle coated with the phenolic novolak resin according to the present invention, it is possible to provide the molded product, wherein little amount of the tar is generated at the time of casting, and wherein very few casting defect is observed.

EXAMPLES

To further clarify the concept of the present invention, some examples of the invention will be described. It is to be understood that the invention is not limited to the details of the illustrated examples and the foregoing description, but may be embodied with various changes, modifications and improvements, which may occur to those skilled in the art without departing from the scope of the invention defined in the attached claims.

In the following description, "%" means "% by mass", unless otherwise explained. In addition, a characteristic (ortho/para bond ratio) of the phenolic resin used to produce RCS for the shall mold and respective characteristics of the produced RCS for the shell mold are measured in accordance with the following test methods.

—Measurement of Ortho/Para Bond Ratio of Methylene Group in Phenolic Resin—

The ortho/para bond ratio (o/p ratio) of methylene group in the phenolic resin was determined by measuring $^{13}$C-NMR (100 MHz, solvent: heavy methanol-d$_4$) of each resin by using a nuclear magnetic resonance (INOVA 400 available from Varian, Inc., U.S.A.) and by calculating by using the following formula:

[ortho/para bond ratio]=$(a+b/2)/(c+b/2)$ wherein,
- a: an integration value of methylene absorption band (30.4~32.4 ppm) of an ortho-ortho bond;
- b: an integration value of methylene absorption band (35.2~36.8 ppm) of an ortho-para bond; and
- c: an integration value of methylene absorption band (40.4~43.0 ppm) of a para-para bond.

—Measurement of Strength of Casting Mold—

There were produced JIS test pieces (width: 10 mm×thickness: 10 mm×length: 60 mm, and heating condition: 250° C.×60 seconds) in accordance with JIS-K-6910, by using the respectively produced RCS for the shell mold. Strength of thus obtained JIS test pieces was measured in accordance with JACT-test method: SM-1, and the strength (N/cm$^2$) was measured and evaluated as the strength of the casting mold.

—Measurement of Amount of Generated Tar—

Four test pieces (size: 10 mm×10 mm×60 mm, and cure condition: 250° C.×60 seconds) for the measurement of the strength of the casting mold were placed in a test tube (internal diameter: 27 mm×length: 200 mm). Previously weighed glass wool (2.5 g) was inserted into the test tube and placed near an opening of the test tube. In this way, a measuring device to measure an amount of generated tar was prepared. The above-mentioned measuring device was inserted into a tubular furnace, in which a temperature was kept at 600° C., and the measuring device was heated for six minutes. Subsequently, the measuring device was taken out of the furnace, and left for cooling to a room temperature. Then, the glass wool was taken out of the measuring device and a mass of the glass wool was measured. The amount of the generated tar (mg) of each of the test pieces was calculated by dividing a value obtained by deleting the mass (mg) of the glass wool before the heating from the mass (mg) of the glass wool after the heating by four.

—Evaluation of Flexibility of Casting Mold—

At first, there was obtained, as a sample for the evaluation of flexibility, by curing a piece of a casting mold made of each kinds of RCS (120 mm×40 mm×5 mm) under a cure condition: at 260° C. for 40 seconds, and then leaving the piece of the casting mold until the sample was cooled to a room temperature.

Subsequently, thus obtained piece of the casting mold was set on a support, and an exothermic stick (Erema exothermic stick having a diameter of 8 mm) was gradually heated from 200° C. up to 800° C. as shown in FIG. 1. Meanwhile, an amount of displacement (deformation) of a position for the measurement of the casting mold was measured, during the heating process, by using a laser displacement gauge which was located at a position 10 mm away from an end portion of the piece of the casting mold. Behaviors with respect to the displacement are as follows: at first the piece of the casting mold is warped due to an expansion behavior caused by the heating of the casting mold; then the piece is started to be bended; and finally, the piece is fractured at practically center of, i.e., at the heated position of the exothermic stick. The term "flexibility" used herein is expressed by a maximum deflection obtained before the piece of the casting mold was fractured. As the value of the flexibility of the casting mold increases, the casting mold is less likely to be deformed, whereby a defect of a crack (occurrence of the casting burr) is hardly occurred.

—Evaluation of Casting—

A casting test was conducted by producing 20 cylinder heads. The casting molds for cylinder heads were molded by using each of RCS, and then, aluminum alloy was poured into the molded products in accordance with a method of low pressure die casting, whereby 20 cylinder heads were produced. Each of thus obtained molded products (cylinder heads) was cut and checked whether there was any casting burr. At the same time, there was also checked whether there was any gas defect within the each of the casting mold.

In this EXAMPLE, there were produced various phenolic novolak resins according to the undermentioned methods, in which kinds and blending amounts of the alkylphenol were varied. There were also produced: a phenolic novolak resin without any alkylphenol; a phenolic novolak resin, in which bisphenol A or a residue from a production of bisphenol A is blended with the phenol; and a resin, in which alkylphenol and oxalic acid as a kind of catalyst was used. Blending ratio of raw materials and ortho/para bond ratio (o/p ratio) of each of the resins are shown in TABLES 1~3 below.

—Production of Phenolic Resin A—

A reaction vessel provided with a thermometer, a stirring device, and a condenser was charged with 180 g of the phenol, 120 g of orthocresol (o-cresol), 64 g of 92% paraformaldehyde, 0.6 g of zinc chloride, and 0.6 g of water. Subsequently, a temperature of an inside of the reaction vessel was gradually raised to a reflux temperature (98105° C.), while these materials were stirred for mixing. Further, the temperature was kept at the same temperature for 30 minutes, whereby a condensation reaction was progressed. After the reaction, thus obtained liquidal reaction product was heated to a temperature (water temperature) of 170° C. and condensed under a reduced pressure, while the reaction product was stirred for mixing, whereby a phenolic novolak resin A (Resin A) was obtained. An ortho/para bond ratio (o/p ratio) of the Resin A was measured, and the ratio was 1.80.

—Production of Phenolic Resin B—

The reaction vessel provided with the thermometer, the stirring device, and the condenser was charged with 240 g of the phenol, 60 g of orthocresol, 69 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the same temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin B (Resin B) was obtained. The ortho/para bond ratio (o/p ratio) of the Resin B was measured, and the ratio was 2.02.

—Production of Phenolic Resin C—

The reaction vessel provided with the thermometer, the stirring device, and the condenser was charged with 120 g of the phenol, 180 g of orthocresol, 67.3 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin C (Resin C) was obtained. The ortho/para bond ratio (o/p ratio) of the Resin C was measured, and the ratio was 2.47.

—Production of Phenolic Resin D—

The reaction vessel provided with the thermometer, the stirring device, and the condenser was charged with 279 g of the phenol, 21 g of orthocresol, 70.1 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin D (Resin D) was obtained. The ortho/para bond ratio (o/p ratio) of the Resin D was measured, and the ratio was 2.35.

—Production of Phenolic Resin E—

The reaction vessel provided with the thermometer, the stirring device, and the condenser was charged with 240 g of the phenol, 60 g of orthoethylphenol (o-ethylphenol), 67.1 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin E (Resin E) was obtained. The ortho/para bond ratio (o/p ratio) of the Resin E was measured, and the ratio was 2.00.

—Production of Phenolic Resin F—

A reaction vessel provided with the thermometer, the stirring device, and the condenser was charged with 84 g of the phenol, 216 g of orthocresol, 64.2 g of 92% paraformaldehyde, 0.6 g of zinc chloride, and 0.6 g of water. Subsequently, the temperature of the inside of the reaction vessel was gradually raised to the reflux temperature (98105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin F (Resin F) was obtained. The ortho/para bond ratio (o/p ratio) of the Resin F was measured, and the ratio was 2.73.

—Production of Phenolic Resin G—

The reaction vessel provided with the thermometer, the stirring device, and the condenser was charged with 300 g of the phenol, 64.5 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin G (Resin G) was obtained. The ortho/para bond ratio (o/p ratio) of the Resin G was measured, and the ratio was 2.12.

—Production of Phenolic Resin H—

The reaction vessel provided with the thermometer, the stirring device, and the condenser was charged with 180 g of the phenol, 120 g of bisphenol A (BPA), 31.5 g of 92% paraformaldehyde, 0.6 g of zinc acetate, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to a temperature (water temperature) of 170° C. and condensed under a reduced pressure, while the reaction product was stirred for mixing, whereby a phenolic novolak resin H (Resin H) was obtained. The ortho/para bond ratio (o/p ratio) of the Resin H was measured, and the ratio was 3.20.

—Production of Phenolic Resin I—

The reaction vessel provided with the thermometer, the stirring device, and the condenser was charged with 240 g of the phenol, 60 g of orthocresol, 69 g of 92% paraformaldehyde, and 0.6 g of oxalic acid. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under a reduced pressure, while the reaction product was stirred for mixing, whereby a phenolic novolak resin I (Resin I) was obtained. The ortho/para bond ratio (o/p ratio) of the Resin I was measured, and the ratio was 1.10.

—Production of Phenolic Resin J—

The reaction vessel provided with a thermometer, a stirring device, and a condenser was charged with 240 g of the phenol, 30 g of orthocresol, 30 g of BPA-ZK (product name: available from Mitsui Chemicals, Inc. (Japan)) which is a residue from a production of bisphenol A, 59.9 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin J (Resin J) was obtained. The ortho/para bond ratio (o/p ratio) of the Resin J was measured, and the ratio was 2.20.

—Production of Phenolic Resin K—

The reaction vessel provided with the thermometer, the stirring device, and the condenser was charged with 240 g of the phenol, 30 g of orthocresol, 30 g of bisphenol A, 53.1 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin K (Resin K) was obtained. The ortho/para bond ratio (o/p ratio) of the Resin K was measured, and the ratio was 2.10.

—Production of Phenolic Resin L—

The reaction vessel provided with the thermometer, a stirring device, and the condenser was charged with 240 g of the phenol, 45 g of orthocresol, 15 g of BPA-ZK (product name: available from Mitsui Chemicals, Inc.) which is the residue from the production of bisphenol A, 59.9 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin L (Resin L) was obtained. The ortho/para bond ratio (o/p ratio) of the Resin L was measured, and the ratio was 2.20.

—Production of Phenolic Resin M—

The reaction vessel provided with the thermometer, the stirring device, and the condenser was charged with 180 g of the phenol, 120 g of BPA-ZK (product name: available from Mitsui Chemicals, Inc.) which is the residue from the production of bisphenol A, 51.4 g of 92% paraformaldehyde, 0.6 g of zinc chloride, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby the phenolic novolak resin M (Resin M) was obtained. The ortho/para bond ratio (o/p ratio) of the Resin M was measured, and the ratio was 2.10.

—Production of Phenolic Resin N—

The reaction vessel provided with the thermometer, the stirring device, and the condenser was charged with 240 g of the phenol, 30 g of orthocresol, 30 g of BPA-ZK (product name: available from Mitsui Chemicals, Inc.) which is the residue from the production of bisphenol A, 59.9 g of 92% paraformaldehyde, 0.6 g of oxalic acid, and 0.6 g of water. Subsequently, the temperature of the inside of the reaction vessel was gradually raised to the reflux temperature (98~105° C.), while these materials were stirred for mixing. Further, the temperature was kept at the reflux temperature for 30 minutes, whereby the condensation reaction was progressed. After the reaction, thus obtained liquidal reaction product was heated to the temperature (water temperature) of 170° C. and condensed under the reduced pressure, while the reaction product was stirred for mixing, whereby a phenolic novolak resin N (Resin N) was obtained. The ortho/para bond ratio (o/p ratio) of the Resin N was measured, and the ratio was 1.20.

Subsequently, various RCS (Samples 1~17) for 17 kinds of shell molds were produced by using the various phenolic resins obtained as described above.

—Production and Evaluation of Sample 1—

A speedmixer for an experiment was charged with 7 kg of preheated fire-resistant particles or filler (Reclaimed Hookersand) at 130~140° C. and 105 g of the phenolic resin A. These materials were mixed in the mixer for 60 seconds, whereby the fire-resistant particles were melt-coated with the phenolic resin A. Subsequently, an aqueous solution of hexamethylenetetramine, which was obtained by dissolving 23.1 g of hexamethylenetetramine as a hardener in 105 g of a cooled water. After these materials were cooled by an air blow, 7 g of calcium stearate was added to the mixture, whereby RCS for the shell mold (Sample 1) was obtained. Thus obtained Sample 1 was subjected to the measurement of the strength of the casting mold, the measurement of the amount of the generated tar, the evaluation of the flexibility of the casting mold, and the evaluation of the actual casting, according to the methods as described above. The results are shown in TABLE 1 below.

—Productions and Evaluations of Samples 2~17—

Samples 2~3, Samples 5~7, Samples 8~10, and Samples 13~17 were produced in accordance with the same conditions as those of Sample 1, except that phenolic novolak resins as shown in TABLES 1~3 were used instead of the phenolic novolak resin A which was used to produce Sample 1. Also, Samples 4, 11, and 12 were produced in accordance with the same conditions as those of Sample 1, except that there were used, in the production, the phenolic novolak resin B, 10.5 g of potassium nitrate as the alkali salt of the oxygen acid, and copper (II) oxide as the metal oxide. The potassium nitrate and the copper (II) oxide were used independently, or were added at the same time. Each of thus obtained Samples was subjected to the measurement of the strength of the casting mold, the measurement of the amount of the generated tar, the evaluation of the flexibility of the casting mold, and the evaluation of the actual casting, similar to those of Sample 1. Thus obtained results are shown in TABLES 1, 2, and 3 below.

TABLE 1

| | | | | Sample No. | | | | | | |
|---|---|---|---|---|---|---|---|---|---|---|
| | | | | 1 | 2 | 3 | 4 | 5 | 6 | 7 |
| RCS | | Filler | | Reclaimed Hookersand | Reclaimed Hookersand | Reclaimed Hookersand | Reclaimed Hookersand | Reclaimed Hookersand | Reclaimed Hookersand | Reclaimed Hookersand |
| | Resin | Composition of phenolic compound (% by mass) | Phenol | 60 | 80 | 40 | 80 | 100 | 60 | 80 |
| | | | o-cresol | 40 | 20 | 60 | 20 | | | 20 |
| | | | BPA | | | | | | 40 | |
| | | | O/P ratio | 1.80 | 2.02 | 2.47 | 2.02 | 2.12 | 3.20 | 1.10 |
| | | | Kind of resin | A | B | C | B | G | H | I |
| | Amounts | Resin | (% by mass/filler) | 1.5 | 1.5 | 1.5 | 1.5 | 1.5 | 1.5 | 1.5 |
| | | Hardener | (% by mass/resin) | 22 | 22 | 22 | 22 | 22 | 22 | 22 |
| | | Alkali metal salt of oxygen acid | (% by mass/resin) | | | | | 10 | | |
| | | Metal oxide | (% by mass/resin) | | | | | 10 | | |
| Properties of casting mold | Strength of casting mold | (N/cm$^2$) | | 470 | 510 | 460 | 490 | 490 | 500 | 490 |
| | Flexibility (Max. deflection) | (mm) | | 6.0 | 2.8 | 8.2 | 3.4 | 0.5 | 2.5 | 1.4 |
| | Amount of generation of tar (600° C.) | (mg) | | 8.5 | 7.3 | 9.8 | 4.3 | 7.5 | 18 | 8 |
| | Actual casting test | No. of cylinderheads with burrs (n = 20) | | 1 | 0 | 0 | 0 | 16 | 0 | 10 |
| | | No. of molds with gas defect (n = 20) | | 0 | 0 | 1 | 0 | 0 | 16 | 0 |

TABLE 2

| | | | | Sample No. | | | | |
|---|---|---|---|---|---|---|---|---|
| | | | | 8 | 9 | 10 | 11 | 12 |
| RCS | | Filler | | Reclaimed Hookersand | Reclaimed Hookersand | Reclaimed Hookersand | Reclaimed Hookersand | Reclaimed Hookersand |
| | Resin | Composition of phenolic compound (% by mass) | Phenol | 93 | 80 | 28 | 80 | 80 |
| | | | o-cresol | 7 | | 72 | 20 | 20 |
| | | | o-ethylphenol | | 20 | | | |
| | | | O/P ratio | 2.35 | 2.00 | 2.73 | 2.02 | 2.02 |
| | | | Kind of resin | D | E | F | B | B |
| | Amounts | Resin | (% by mass/filler) | 1.5 | 1.5 | 1.5 | 1.5 | 1.5 |
| | | Hardener | (% by mass/resin) | 22 | 22 | 22 | 22 | 22 |
| | | Alkali metal salt of oxygen acid | (% by mass/resin) | | | | 10 | |
| | | Metal oxide | (% by mass/resin) | | | | | 10 |
| Properties of casting mold | Strength of casting mold | (N/cm$^2$) | | 480 | 460 | 530 | 500 | 500 |
| | Flexibility (Max. deflection) | (mm) | | 1.8 | 2.8 | 9.8 | 3.0 | 3.1 |
| | Amount of generation of tar (600° C.) | (mg) | | 7.3 | 7.5 | 13.5 | 6.5 | 5.8 |
| | Actual casting test | No. of cylinderheads with burrs (n = 20) | | 6 | 0 | 0 | 0 | 0 |
| | | No. of molds with gas defect (n = 20) | | 0 | 0 | 7 | 0 | 0 |

TABLE 3

|  |  |  |  | Sample No. | | | | |
|---|---|---|---|---|---|---|---|---|
|  |  |  |  | 13 | 14 | 15 | 16 | 17 |
| RCS |  | Filler |  | Reclaimed Hookersand | Reclaimed Hookersand | Reclaimed Hookersand | Reclaimed Hookersand | Reclaimed Hookersand |
|  | Resin | Composition of phenolic compound (% by mass) | Phenol | 80 | 80 | 80 | 60 | 80 |
|  |  |  | o-cresol | 10 | 10 | 15 |  | 10 |
|  |  |  | BPA |  | 10 |  |  |  |
|  |  |  | BPA-ZK | 10 |  | 5 | 40 | 10 |
|  |  | O/P ratio |  | 2.20 | 2.10 | 2.20 | 2.10 | 1.20 |
|  |  | Kind of resin |  | J | K | L | M | N |
|  | Amounts | Resin | (% by mass/filer) | 1.5 | 1.5 | 1.5 | 1.5 | 1.5 |
|  |  | Hardener | (% by mass/resin) | 22 | 22 | 22 | 22 | 22 |
| Properties of casting mold | Strength of casting mold | (N/cm$^2$) |  | 460 | 480 | 470 | 470 | 460 |
|  | Flexibility (Max. deflection) | (mm) |  | 3.8 | 3.2 | 3.2 | 3.5 | 1.7 |
|  | Amount of generation of tar (600° C.) | (mg) |  | 7.2 | 8.5 | 6.6 | 15 | 8 |
|  | Actual casting test | No. of cylinderheads with burrs (n = 20) |  | 0 | 0 | 0 | 0 | 10 |
|  |  | No. of molds with gas defect (n = 20) |  | 0 | 1 | 0 | 12 | 0 |

As is apparent from results in TABLES 1~3, in RCS for the shell mold (Samples 1~4, Sample 9, and Samples 11~15), wherein the resin composition (bond) to coat the fire-resistant particles is the alkylphenol-modified resin composition which is the phenolic novolak resin obtained by using o-cresol or o-ethylphenol together with the phenol, and wherein the ortho/para bond ratio of the structure of the methylene groups in the phenolic resin is not less than 1.5, same as the present invention, an excellent flexibility of the casting mold was exhibited, compared with RCS for the shell mold (Sample 5, 6, and 16), of which the ortho/para bond ratio was not less than 1.5, but the fire-resistant particles were coated with the resin composition (bond) which did not include the at least one of alkylphenols. In addition to the above, there was also confirmed that the amount of the generation of the tar of each of Samples 1~4, Sample 9, and Samples 11~15 at 600° C. was not more than 10 mg.

There were also executed the actual casting by using each of the casting molds formed by the various RCS for the shell molds obtained by using each of the resin compositions, and the each of the casting molds was evaluated. In the evaluation in the actual casting, there was confirmed that the problem of the gas defect caused by the tar generated at the time of the casting and the problem of the casting defect of the veining were able to be solved at the same time, although these problems had been regarded as being difficult to be solved. In particular, in Sample 4, there was confirmed that the amount of the generation of the tar was drastically reduced without deteriorating the flexibility of the casting mold, by using the alkali metal salt of the oxygen acid (potassium nitrate) and/or the copper (II) oxide as a predetermined oxygen acid for the resin composition for the shell mold of the present invention. Accordingly, there is expected to reduce a frequency of maintenance of the vent of a die for casting which is needed to recover the gas defect at the time of the casting. As a result, there can be further improved the productivity of the molded products of a high quality.

Moreover, as is apparent from the results shown in TABLE 3, in RCS for the shell mold (Samples 13~15), which is formed of the fire-resistant particles coated with the phenolic resins J, K, and L obtained by using bisphenol A or the residue from the production of bisphenol A, together with the alkylphenol, there were exhibited improved results in terms of the flexibility and the amount of the generation of the tar. There was also confirmed that Samples 13~15 provide excellent results in an actual casting test.

What is claimed is:

1. A phenolic novolak resin for a shell mold, characterized in that:
    the phenolic novolak resin is obtained by reacting phenolic compounds, which include a phenol and an alkylphenol, with at least one of aldehydes; and
    a ratio of an ortho-bond to a para-bond of a methylene group in the phenolic novolak resin is not less than 1.5, wherein amounts of the phenol and the alkylphenol are 90~30 percents by mass and 10~70 percents by mass, respectively, based on a total amount of the phenol and the alkylphenol.

2. The phenolic novolak resin for a shell mold according to claim 1, wherein the alkylphenol is orthocresol.

3. The phenolic novolak resin for a shell mold according to claim 1,
    wherein the phenolic compounds further include at least one of third components selected from the group consisting of bisphenol A, a residue from a production of bisphenol A, a separated compound in the residue, and a derivative of the separated compound.

4. The phenolic novolak resin for a shell mold according to claim 3,
    wherein the at least one of third components included in the phenolic compound is not more than 100 parts by mass per 100 parts by mass of the alkylphenol.

5. A process for producing a phenolic novolak resin for a shell mold according to claim 1, wherein
    the phenolic compounds and the at least one of aldehydes are reacted in the presence of a divalent metal salt.

6. A resin coated sand for a shell mold, wherein
    the resin coated sand is formed by coating a fire-resistant particle with the phenolic novolak resin according to claim 1.

7. The resin coated sand for a shell mold according to claim 6,
    wherein:
    a test piece of the resin coated sand made in accordance with provisions of JIS K 6910 generates a tar of not more than 10 mg, when the test piece is heated in a tubular furnace at 600° C. for six minutes; and a flexibility of a casting mold formed of the resin coated sand is not less than 2 mm.

8. The resin coated sand for a shell mold according to claim 6, further comprising
an alkali metal salt of an oxygen acid.

9. The resin coated sand for a shell mold according to claim 6, further comprising
at least one of metal oxides selected from the group consisting of iron, copper, nickel, cobalt, manganese, and zinc.

10. A casting mold obtained by forming and heat-curing the resin coated sand for a shell mold according to claim 6.

* * * * *